June 26, 1951 A. G. PERKINS 2,558,152
CONTROL UNIT FOR MILKING MACHINES
Filed Oct. 30, 1948 2 Sheets-Sheet 1

Inventor
Albert G. Perkins,
By *Charles P. Geyer*
Attorney

June 26, 1951 — A. G. PERKINS — 2,558,152
CONTROL UNIT FOR MILKING MACHINES
Filed Oct. 30, 1948 — 2 Sheets-Sheet 2
FIG. 4.
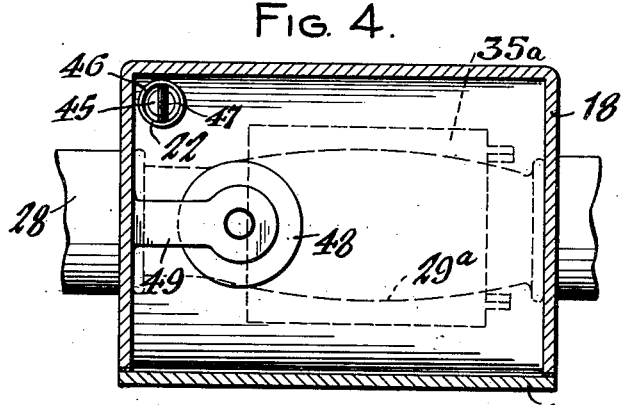
FIG. 5.
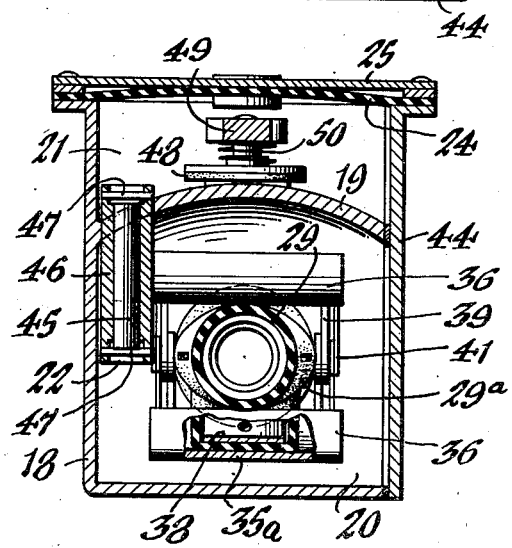
FIG. 6.
Inventor
Albert G. Perkins
By Walter P. Geyer
Attorney Patented June 26, 1951

2,558,152

UNITED STATES PATENT OFFICE 2,558,152

CONTROL UNIT FOR MILKING MACHINES

Albert G. Perkins, Grand Island, N. Y.

Application October 30, 1948, Serial No. 57,609

14 Claims. (Cl. 119—14.08)

This invention relates to an automatically operated teat cup releasing device for milking machines for causing the dropping of the teat cups from the cow as the respective quarters of the cow's bag are milked out and thereby prevent injury to her by leaving the machine on too long.

It has for one of its objects to provide a sanitary and self-contained device or appliance of this character which is adapted to be interposed in each of the milk flow connections of a milking machine with its operating parts isolated from contact with the milk, and which is designed to automatically cut off the vacuum in the milk flow connection to the teat cup when the surge of milk from the companion quarter of the cow's bag substantially ceases to thereupon cause that cup to be released and drop by gravity from the cow.

Another object of the invention is to provide an individual teat cup releasing device consisting of a body adapted to be detachably interposed in the teat cup connection of a milking machine and having adjoining fluid chambers in valve-controlled communication with each other, a contractible, valve-performing tube section disposed in fluid-sealed relation in one of the chambers and in milk flow communication with the teat connection, and means applied to the diametrically opposite faces of the tube section and including opposing jaw-like elements releasably contractible about the tube section in a given transverse plane and responsive to the change of fluid pressure in such chamber caused by the variation in vacuum in that connection when the surge of milk from the cow substantially ceases to effectually close and seal such tube section and cause the companion teat cup to drop from the cow.

Other features of the invention reside in the construction and arrangement of parts hereinafter described and particularly pointed out in the appended claims.

Figure 1:
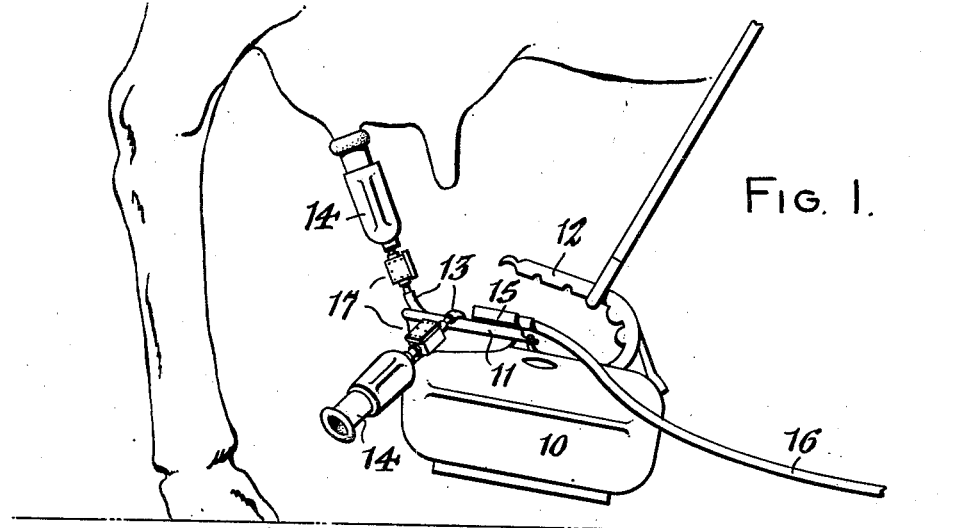
Figure 2:
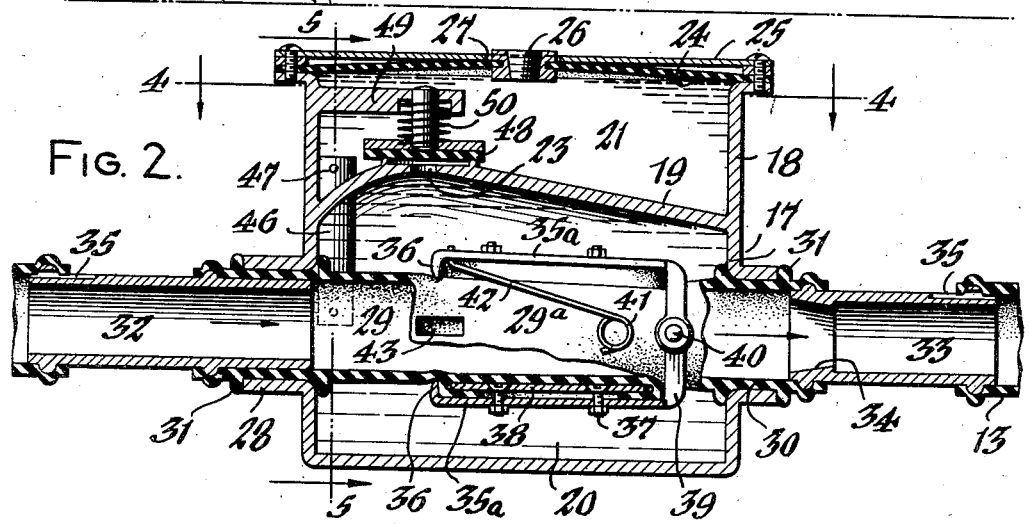
Figure 3:
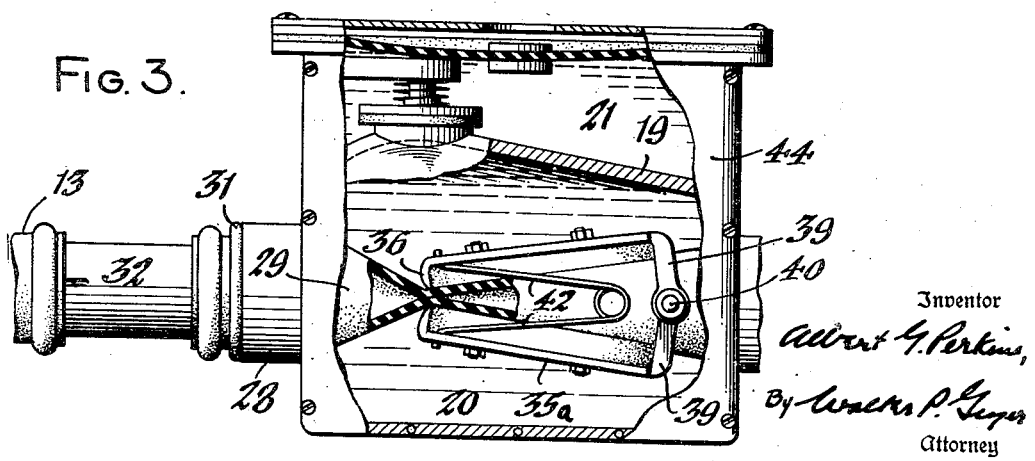

In the accompanying drawings:

Figure 1 is a side view of a milking machine suspended in operative relation to the cow and showing my control device in the teat cup connections thereof, one of the cups being shown as having been automatically dropped from the cow after the corresponding quarter had been milked out. Figure 2 is an enlarged vertical longitudinal section of one of the devices in a milking position. Figure 3 is a similar view, partly in elevation, showing the parts in a shut off position. Figure 4 is a horizontal section taken on line 4—4, Figure 2. Figure 5 is a transverse section taken on line 5—5, Figure 2. Figure 6 is a detached perspective view of one of the tube sections or valve units of the device.

Similar characters of reference indicate corresponding parts throughout the several views.

By way of example, I have shown my teat cup dropping control device or controlled quarter milker device applied to a well known type of pulsating milking machine wherein 10 indicates the milk-receiving can having a cover 11 and bail 12, the cover having milk-intake tubes radiating therefrom and each connected by a flexible conduit or hose connection 13 having a teat cup 14 at its free end for detachable connection to one of the cow's teats. Also applied to the cover is the customary pulsator 15 which is connected by a hose 16 to the suction source. Interposed substantially axially in each hose connection 13 is one of my control units, indicated generally by the numeral 17, through which the milk flows from the cow to the can, and which performs as a valve, as each quarter of the cow's bag is milked out, to automatically shut off the vacuum thereto and cause the companion teat cup to drop from the cow, as depicted in Figure 1, to effectually prevent injury to the cow from overmilking, and subsequently cause the automatic restoration of the unit to its initial position.

In the preferred embodiment of my invention shown in the drawings, each control unit consists of a hollow body or casing 18 having a partition 19 therein dividing it into a lower chamber 20 and an upper chamber or reservoir 21, each adapted to be filled with a constant viscosity fluid and with the partition provided with a vent port 22 and a check valve controlled port 23 whereby communication between these chambers is established and automatically controlled in accordance with a change in the vacuum which takes place during the operation of the milking machine. One of the walls of the chamber, by preference the top wall thereof, is provided with a displaceable diaphragm 24 secured at its marginal edges to the flanged top of the body and normally covered or shielded by a cover plate 25. This diaphragm has a filling opening normally sealed closed by a plug 26 for facilitating the charging of the body-chambers with fluid and the cover plate has an opening 27 therein alined with and into which the top of the plug may protrude for access. It will be noted that the partition 19 is concave on its underside and the port 23 is located in the center or highest point of its concavity to insure the positive displacement or expulsion of any air from the lower chamber 20 during the charging of the same with the fluid, so that when ready for operation the device is free from air.

At its opposite ends and substantially centrally of its lower chamber the body 18 has alined nipples 28 thereon for supporting the intake and discharge ends of a flexible, contractible tube-like conduit section or valve member 29 extending from end to end of such lower chamber in fluid sealed relation thereto and in interposed milk flow communication with the companion teat connection 13. That portion of the tube section within the chamber and which is adapted to be contracted from the position shown in Figure 2 to that shown in Figure 3, is somewhat laterally enlarged or widened into elliptical-like cross section, as indicated at 29ᵃ, with flat top and bottom surfaces to more readily respond to a collapsing of such section to a shut off position by the vacuum in the system when the companion bag-quarter is milked out. This tube section has attaching collars 30 at its ends which snugly fit the bores of the body-nipples and spaced flanges 31 are provided thereon which abut the opposing inner faces of the chamber end walls and the ends of the nipples 28, as shown in Figure 2. Tubular inserts or adapters 32, 33 are provided for coupling the intake and discharge ends of the tube section to the companion branches of the teat connection, the insert 33 preferably having its inlet portion slightly converging, as indicated at 34, for retarding the flow of milk flowing through the unit to such an extent and between pulsations as to prevent the closing of the tube section or valve member 29 and the shutting off of the vacuum to the teat cup during normal milking operations or during such times as the cow may temporarily let down on her milking. Vent passages 35 are provided in the teat connection at either side of the control unit, as shown in Figure 2, to properly vent the same to the atmosphere after the companion quarter of the cow's bag has been milked out and the tube section contracted to its closed position to permit the corresponding teat cup to drop from the cow and the displaced or contracted parts of the control unit to return to their initial or normal position.

Means are applied to the widened portion 29ᵃ of the tube section 29 as an integral part thereof for causing its contraction along a transverse plane or line to a closed position when the surge of milk from the cow substantially ceases. As shown in Figures 2, 3 and 6 of the drawings, this means preferably consists of flat plates 35a, 35a applied to the diametrically opposite or flat exterior faces of the tube section to move therewith toward and from each other and having oppositely-facing tube-engaging elements or jaws 36 at one end for biting into and contracting the tube section to a closed position. These plates may be secured in place in any suitable manner, as by bolts 37 applied to attaching plates 38 embedded in the flat top and bottom portions of the tube section. For the purpose of properly and uniformly guiding the jaw elements to cause them to shut off the tube section along a transverse line, I preferably provide the other ends of the companion plates 35a with opposing laterally-spaced hinge ears 39 joined by transverse pintles 40 at opposite sides of the tube section and in the axial plane thereof. While the elasticity of the rubber tube section 29 would normally urge the hinged plates to their expanded position shown in Figure 2, I preferably employ coil springs 41 between such plates at opposite sides of the widened portion of the tube section with the legs 42 thereof detachably fitted in corresponding openings in the tube-contracting plates 35a. To insure the closing of the widened portion of the tube section at its resulting crimped or folded ends when the plate-jaws are contracted, such ends are recessed, as indicated at 43, to reduce the thickness of the tube-walls at those points.

One of the walls of the casing 18 is open to facilitate the assembly of the tube section or valve member 29 therein and is normally closed fluid tight by a cover 44.

The vent port 22 constitutes a by-pass between the chambers 20, 21 and is of substantially capillary dimensions for the flow of fluid therebetween and to this end it is in the form of a plunger 45 freely movable to a limited extent in an open ended cylinder 46 formed in the casing between the chambers and having stop pins 47 at its opposite ends for limiting the travel of such plunger. During the flow of fluid from one chamber to the other the resulting pressure causes a displacement of the plunger in one direction or the other to insure a clean vent at all times and prevent its clogging, the vent resulting from the slight clearance provided between the plunger and cylinder.

The port 23 is normally closed by a check valve 48 which is guided on a bracket 49 formed in the reservoir chamber 21 and has a spring 50 for urging it downwardly to a closed position. This valve is adapted to open upwardly by the pressure exerted on the fluid in the lower chamber 20 when the tube section 29 is caused to expand during the restoring cycle of operations following the dropping of the companion teat cup from the cow to thereby accelerate the reverse flow of fluid from the lower chamber to the upper chamber. It should be pointed out here that during the contraction of the tube section 29 to shut off the vacuum to the teat cup, the flow of fluid from the upper to the lower chamber is comparatively slow to afford a gradual contraction operation and time this operation accordingly so that during the time or times the cow may temporarily let down on her milking the elapsed time, usually less than a minute, is not sufficient to cause the contraction of this tube section to its closed condition and the further surge of milk again causes the expansion of the tube section to its open position.

In operation, each control unit operates independently to shut off the vacuum to its teat cup when the companion quarter of the cow's bag is milked out, the vacuum at that time being substantially constant in the unit and causing the latter to assume the position shown in Figure 3, with the tube-section or valve member 29 drawn together and sealed to a shut off position by the plates 35a. As the tube-section is contracted when no milk is surging through it, there is a resulting displacement of the fluid from the reservoir 21 to the chamber 20 through the vent port 22 with the result that the plates 35a gradually contract about the tube-section to effectually seal it. Upon sealing of the tube-section in this manner, atmosphere is admitted through the vent passages 35 to cause the companion teat cup to drop from the cow and the displaced or contracted parts of the control unit to return to their initial position and the displaced fluid to return from the chamber to the reservoir through the port 23. During the normal milking operation with the milk surging through the unit, the tube section and jaw plates partially collapse or fluctuate somewhat in response to the operating cycle of the milking machine or should the cow temporarily hold up on her milking, but such displacement is not sufficient, because of the time element transpiring during such periods, to effect the complete and sealed collapse of the tube-section.

I claim as my invention:

1. A control device for milking machines having a teat cup connection, comprising a body adapted to be interposed in the teat cup connection and having adjoining chambers adapted to be filled with a fluid and ports for establishing fluid communication between such chambers, a normally-closed check valve in correlation to one of said ports and adapted to open to cause the flow of fluid from one chamber into the other, the other port constituting a by-pass of substantially capillary dimensions for the flow of fluid between said chambers, and a flexible, contractible tube-like valve member suspended in one of the chambers in milk flow communication with the teat connection and including opposing elements applied thereto for contracting such member transversely to a closed position when the surge of milk from the cow substantially ceases.

2. A control device for milking machines having a teat cup connection, comprising a body adapted to be interposed in the teat cup connection and having a partition therein dividing it into a lower chamber and an upper chamber each adapted to be filled with a fluid and having ports therein for establishing fluid communication with said chambers, a portion of the upper body-chamber including a flexible diaphragm adapted to expand and contract in accordance with the flow of fluid to and from such chamber, a normally-closed check valve in correlation to one of said ports and adapted to automatically open to cause the flow of liquid from the lower chamber into the upper chamber, the other port constituting a by-pass of substantially capillary dimensions for the flow of fluid between said chambers, and a flexible, contractible tube-like valve member suspended in said lower chamber in milk flow communication with the teat connection and including opposing elements applied to opposite sides thereof for contracting such valve member to a closed position when the surge of milk from the cow substantially ceases.

3. A control device for milking machines having a teat cup connection, comprising a body having a fluid-filled chamber and an adjoining reservoir in valved communication therewith for controlling the flow of fluid therebetween, a collapsible tube section extending substantially centrally through said chamber in fluid sealed relation thereto and adapted for milk flow communication with the teat cup connection of the milking machine, and means applied to diametrically opposite sides of said tube section and including opposing jaw-like members contractible about the same to a closed sealed position.

4. A control device for milking machines having a teat cup connection, comprising a body having a fluid-filled chamber and an adjoining reservoir in valved communication therewith for controlling the flow of fluid therebetween, a collapsible tube section extending substantially centrally through said chamber in fluid sealed relation thereto and adapted for milk flow communication with the teat cup connection of the milking machine, and means applied to diametrically opposite sides of said tube section in hinged relation at one end transversely of such section and having opposing jaw-like members at their other ends for releasable contractible engagement with the tube-section.

5. A control device for milking machines having a teat cup connection, comprising a body having a fluid-filled chamber and an adjoining reservoir in valved communication therewith for controlling the flow of fluid therebetween, a collapsible tube section extending substantially centrally through said chamber in fluid sealed relation thereto and adapted for milk flow communication with the teat cup connection of the milking machine, and plates applied to diametrically opposite sides of said tube section and provided at one end with hingedly connected ears and at their other end with tube-engaging flanges for releasable contractible engagement with the tube section.

6. A control device for milking machines having a teat cup connection, comprising a body having a fluid-filled chamber and an adjoining reservoir in valved communication therewith for controlling the flow of fluid therebetween, a collapsible tube section extending substantially centrally through said chamber in fluid sealed relation thereto and adapted for milk flow communication with the teat cup connection of the milking machine, plates applied to diametrically opposite sides of said tube section and provided at one end with hingedly connected ears and at their other end with tube-engaging flanges for releasable contractible engagement with the tube section, and springs acting on said hinged plates for normally urging them and their flanges to an expanded released position.

7. A control device for milking machines having a teat cup connection, comprising a body having a fluid-filled chamber and an adjoining reservoir in capillary-like flow communication therewith, a one-way check valve for normally preventing flow of fluid from the reservoir to said chamber, a collapsible tube section extending substantially centrally through said chamber in fluid sealed relation thereto and adapted for milk flow communication with the teat cup connection of the milking machine, and hinged means embracing diametrically opposite sides of said tube section for automatically contracting it to cut off the vacuum to the teat cup when the flow of milk from the cow substantially ceases.

8. A control device for milking machines having a teat cup connection, comprising a body having a fluid-filled chamber and an adjoining reservoir in capillary-like flow communication therewith, a check valve for normally preventing flow of fluid from the reservoir to said chamber, a collapsible tube section extending substantially centrally through said chamber in fluid sealed relation thereto and adapted for milk flow communication with the teat cup connection of the milking machine, and members applied to diametrically opposite sides of said tube section for displacement toward each other when the flow of milk from the cow substantially ceases, and having oppositely-facing, tube-engaging elements thereon for contracting the tube section to cut off the vacuum to the teat cup.

9. A control device for milking machines having a teat cup connection, comprising a body having a fluid-filled chamber and an adjoining reservoir in capillary-like flow communication therewith, a check valve for normally preventing flow of fluid from the reservoir to said chamber, a collapsible tube section extending substantially centrally through said chamber in fluid sealed relation thereto and adapted for milk flow communication with the teat cup connection of the milking machine, and plates applied to diametrically opposite sides of the tube section walls to move therewith in response to the surge of milk therethrough and to move toward each other when the flow of milk from the cow substantially ceases, said plates being hinged to each other at one end and having oppositely-facing, tube-engaging elements at their other ends for contracting the tube section to cut off the vacuum to the teat cup.

10. A control device for milking machines having a teat cup connection, comprising a body having a fluid-filled chamber and an adjoining reservoir in capillary-like flow communication therewith, a check valve for normally preventing flow of fluid from the reservoir to said chamber, a collapsible tube section extending substantially centrally through said chamber in fluid sealed relation thereto and adapted for milk flow communication with the teat cup connection of the milking machine, plates applied to diametrically opposite sides of the tube section walls to move therewith in response to the surge of milk therethrough and to move toward each other when the flow of milk from the cow substantially ceases, said plates being hinged to each other at one end and having oppositely-facing tube-engaging elements at their other ends for contracting the tube section to cut off the vacuum to the teat cup, and a spring disposed between said plates for normally urging them to their expanded tube-released position.

11. A control device of the character described, comprising a body adapted to be interposed in the teat cup connection of a milking machine and having a partition therein dividing it into a lower chamber and an upper chamber each adapted to be filled with a fluid and having ports therein for establishing fluid communication with said chambers, a portion of the upper body-chamber including a flexible diaphragm adapted to expand and contract in accordance with the flow of liquid to and from such chamber, a normally-closed check valve in correlation to one of said ports and adapted to automatically open to cause the flow of liquid from the lower chamber into the upper chamber, the other port constituting a by-pass of substantially capillary dimensions for the flow of fluid between said chambers, a flexible, contractible tube-like valve member fitted in said lower chamber for connection at its opposite ends in milk flow communication with the teat connection and including opposing elements applied to opposite sides thereof for contracting such valve member in a transverse plane to a closed position when the surge of milk from the cow substantially ceases, and means in the teat connection adjacent the opposite ends of said tube-like valve member for venting the latter and said connection to the atmosphere.

12. The combination with a milking machine, of a body forming a chamber having nipples at its ends adapted to be interposed in a teat connection thereof and including a collapsible tube extending through said chamber in milk flow communication with said connection and fitted at its ends in said nipples, displaceable means within said body in embracing-like relation to said tube for contracting it to a closed sealed postion when the flow of milk therethrough substantially ceases, and attaching inserts fitted in the opposite ends of said tube, one of the inserts having that end thereof facing the tube converging toward the axis thereof.

13. The combination with a milking machine, of a body having intercommunicating fluid chambers adapted to be interposed in the milk tube of a teat cup connection thereof and including a collapsible tube section extending through one of said body chambers in fluid-sealed, suspended relation thereto and in milk flow communication at its ends with the teat connection and having a widened portion intermediate its ends of substantially elliptical-like cross section with substantially flat exterior top and bottom surfaces, and means applied to said tube section surfaces and terminating at one end in opposing jaw-like elements contractible about such section to a closed sealed position.

14. The combination with a vacuum type milking machine, of a body adapted to be interposed in a teat connection thereof and having a fluid-filled chamber and an adjoining reservoir in valved communication therewith, a flexible contractible tube section in supporting engagement at its ends with said body and extending through said chamber in fluid-sealed relation thereto and adapted for vacuum and milk flow communication with the teat cup connection, and means in substantially embracing relation to said tube section to move and contract therewith in response to the variation in the vacuum therein and the change of fluid pressure in said chamber, said means including opposing elements engageable with the tube section to contract the same to a closed position along a transverse line.

ALBERT G. PERKINS.

REFERENCES CITED

The following references are of record in the file of this patent:

UNITED STATES PATENTS

| Number | Name | Date |
|---|---|---|
| 1,100,829 | Joseph | June 23, 1914 |
| 1,104,508 | Huthsing | July 21, 1914 |
| 1,109,800 | Sorensen | Sept. 8, 1914 |
| 1,120,002 | Walquist | Dec. 8, 1914 |
| 1,387,983 | Hofmeister | Aug. 16, 1921 |
| 1,546,998 | Rogers | July 21, 1925 |
| 2,197,995 | Crowley | Apr. 23, 1940 |
| 2,216,296 | Raymond et al. | Oct. 1, 1940 |
| 2,245,030 | Gottesfeld et al. | June 10, 1941 |
| 2,305,840 | Brown et al. | Dec. 22, 1942 |
| 2,387,660 | Hall et al. | Oct. 23, 1945 |
| 2,396,544 | Voyle et al. | Mar. 12, 1946 |

FOREIGN PATENTS

| Number | Country | Date |
|---|---|---|
| 56,661 | Denmark | Apr. 13, 1942 |